United States Patent
Perez et al.

(10) Patent No.: US 7,356,336 B2
(45) Date of Patent: Apr. 8, 2008

(54) SYSTEMS AND METHODS OF RECORDING EVENTS ONBOARD A VEHICLE

(75) Inventors: Ralph S. Perez, Long Beach, CA (US); Luigi P. Righi, Laguna Hills, CA (US); Joseph F. Sunio, Cerritos, CA (US); Mark A. Talbot, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 669 days.

(21) Appl. No.: 10/752,327

(22) Filed: Jan. 6, 2004

(65) Prior Publication Data

US 2005/0148327 A1    Jul. 7, 2005

(51) Int. Cl.
*H04Q 7/20*    (2006.01)

(52) U.S. Cl. .................... 455/431; 455/98; 455/345

(58) Field of Classification Search .............. 455/431, 455/11.1, 427, 445, 13.1, 569.2, 95, 98, 99, 455/344, 345
See application file for complete search history.

(56) References Cited

U.S. PATENT DOCUMENTS

| | | | |
|---|---|---|---|
| 4,788,531 A | 11/1988 | Corwin et al. | |
| 5,784,547 A | 7/1998 | Dittmar et al. | |
| 5,920,807 A | 7/1999 | Lemme | |
| 6,115,656 A | 9/2000 | Sudolsky | |
| 7,203,630 B2 * | 4/2007 | Kolb et al. | 703/6 |
| 2003/0069015 A1 * | 4/2003 | Brinkley et al. | 455/431 |
| 2003/0093187 A1 * | 5/2003 | Walker | 701/1 |
| 2003/0206100 A1 | 11/2003 | Richman et al. | |
| 2004/0002794 A1 | 1/2004 | Pillar et al. | |
| 2004/0176887 A1 * | 9/2004 | Kent et al. | 701/30 |

OTHER PUBLICATIONS

*Boeing picks SBC to run test-flight acquisition*; Thales Computers; Nov. 2002; 2 pages; available at <http://www.electronicstalk.com/news/tha/tha106.html> (visited Dec. 30, 2003).
*The C-17 Integrated Fleet Management/AWODS Team*; Boeing Frontiers Online; Dec. 2003/Jan. 2004; 2 pages; vol. 02, Issue 08; available at <http://www.boeing.com/news/frontiers/ts_sf4f.html> (visited Dec. 30, 2003).

* cited by examiner

*Primary Examiner*—CongVan Tran
(74) *Attorney, Agent, or Firm*—Alston & Bird LLP

(57) ABSTRACT

A system is provided that comprises a vehicle (e.g., aircraft) including a plurality of modules (e.g., line-replaceable units—LRU's) capable of communicating over a plurality of buses (e.g., Mil-Std-1553 buses). The system also includes an advanced wireless open data controller (AWOC) capable of receiving data output onto the buses of the vehicle during operation of the vehicle, such as during flight of an aircraft. The AWOC is also capable of comparing the output data to a database of known events of the modules. Then, when the output data matches a known event for at least one module, the AWOC is capable of identifying an event. The AWOC can package event data including the identified event. A data unit, also included within the system, is capable of transmitting the packaged event data external to the vehicle at least partially over a wireless communication link.

23 Claims, 6 Drawing Sheets

SYSTEMS AND METHODS OF RECORDING EVENTS ONBOARD A VEHICLE

FIELD OF THE INVENTION

The present invention generally relates to systems and methods of recording data onboard a vehicle and, more particularly, relates to systems and methods of recording events from data output from line replaceable units (LRU's) of a vehicle.

BACKGROUND OF THE INVENTION

Modern day aircraft, and particularly modern day military aircraft, typically make use of a large number of actuators, sensors, modules and other components. These components produce, or can be monitored to obtain, signals indicative of their performance during takeoff, landing and other aircraft flight phases. Often one or more aircraft components are monitored and/or controlled by a module called a "line-replaceable-unit" (LRU). An LRU is a highly complex module often incorporating several processors for controlling and/or monitoring one or more components or subassemblies of an aircraft. An LRU may be provided to monitor and/or control one or more external devices such as an actuator, valve, motor, etc., associated with a particular component or assembly of the aircraft. An LRU typically also generates output signals which can be monitored to determine if the LRU and/or the component with which it is associated is not operating properly. Examples of some of the LRU's associated with a C-17 aircraft are listed as follows to provide an appreciation as to the wide ranging and diverse functions of a typical military aircraft which the LRU's are responsible for controlling:

| System/Component | Acronym |
| --- | --- |
| Emergency Egress Sequencer | ES |
| Aerial Delivery Locks Control Panel | ADLCP |
| Cargo Delivery System Control-Status Panel | CDSCSP |
| Aerial Delivery System Controller | ADSC |
| Aircraft Fault-Function Indicator Panel | AFFIP |
| Sensor Signal Interface | SSI |
| Antiskid-Brake Temperature Monitor Control Unit | ABTMCU |
| Electronic Engine Control | EEC |
| Electronic Engine Control (for Auxiliary EEC Power) | EEC |
| Auxiliary Power Unit Control Panel | APUCP |
| Environmental System-Fire Detection Control Panel | ESFDCP |
| Temperature Control Panel | TCP |
| Environmental Control System Controller | ECSC |
| Manifold Failure Detection Controller | MFDC |
| Cabin Pressure Controller | CPC |
| Cabin Air Pressure Selector Panel | CAPSP |
| Windshield Anti-icing Control Box | WAICB |
| Window Defogging Control Box | WDCB |
| Battery Charger | no acronym |
| Generator Control | GC |
| Electrical System Control Panel (Electrical Control Panel) | ECP |
| Static Frequency Converter (60 Hertz Converter) | no acronym |
| Static Power Inverter | no acronym |
| Bus Power Control Unit | BPCU |
| Hi-Intensity Wingtip Lights Power Supply | no acronym |
| Upper & Lower Beacon Light Power Supply | no acronym |
| Power Supply-Dimming Unit | no acronym |
| Battery Charger Set (Emergency Lighting Battery/Charger) | no acronym |
| Hydraulic System Controller | HSC |
| Hydraulic System Control Panel | HSCP |
| Fuel System-Engine Start Control Panel | FSESCP |
| Liquid Quantity Indicator | LQI |
| Ground Refueling Control Panel | GRCP |
| Fuel Quantity Computer | FQC |
| Fluid Purity Controller | FPC |
| Bearing-Distance-Heading Indicator | no acronym |
| Engine-Thrust Rating Panel Display | ETRPD |
| Signal Data Recorder | no acronym |
| (Quick Access Recorder) | (QAR) |
| Standard Flight Data Recorder | SFDR |
| Propulsion Data Management Computer | PDMC |
| (Aircraft Propulsion Data Management Computer) | (APDMC) (APM) |
| Flight Control Computer | FCC |
| Actuator Flight Control Panel | AFCP |
| Automatic Pilot Control-Indicator | APCI |
| Ground Proximity Warning Control Panel | GPWCP |
| Spoiler Control-Electronic Flap Computer | SCEFC |
| Display Unit | DU |
| (Multi Function Display) | (MFD) |
| Multifunction Control Panel | MCP |
| Air Data Computer | ADC |
| Inertial Reference Unit | IRU |
| Head-Up Display Unit ("Glass-cockpit" Display) | HUDU |
| Digital Computer | DC |
| (Mission Computer) | (MC) |
| Display Unit | (DU) |
| (Mission Computer Display) | (MCD) |
| Data Entry Keyboard | DEK |
| (Mission Computer Keyboard) | (MCK) |
| Intercommunications Set Control | ICSC |
| Intercommunications station | no acronym |
| Audio Frequency Amplifier | no acronym |
| Public Address Set Control | no acronym |
| Cordless Headset | no acronym |
| Radio Receiver-Transmitter | no acronym |
| Cargo Winch Remote Control | no acronym |
| Battery Charger | no acronym |
| Communication-Navigation Equipment Control | CNEC |
| Communications Equipment Control | CEC |
| Central Aural Warning Computer | CAWC |
| Warning And Caution Computer | WACC |
| Warning and Caution Annunciator Panel | WACAP |
| Signal Data Converter | SDC |
| Coder Decoder Keying Device | CDKD |
| Transponder Set Test Set | no acronym |
| (I-Band Transponder Test Set) | (TTU) |
| Satellite Data Unit | SDU |
| Communications Management Unit | CMU |
| Signal Acquisition Unit | SAU |

It will also be appreciated that aircraft such as the C-17 aircraft include a wide variety of actuators and sensors that provide output signals that can be monitored and recorded, but which do not have an LRU associated therewith. These components include, but are not limited to electrical and electromechanical actuators, valves, transducers, sensors, etc. Thus, it will be appreciated that most modern day aircraft, and especially modern-day military aircraft, have an extremely wide number of diverse components which are monitored to help insure proper operation.

Typically, aircraft such as the C-17 aircraft, undergo a number of pre-delivery test flights in which the LRU's and other components of the aircraft are monitored and tested for proper operation of such LRU's and other components. In accordance with one conventional technique for monitoring and testing the LRU's and other components, during a test flight, onboard computing systems record data output from a number of LRU's and other components onto a data bus, such as a Mil-Std-1553 data bus or Aeronautical Radio, Inc. (ARINC) standard 429 data bus. Then, to monitor and test LRU's and other components for systems such as aircraft warning and caution systems, aircrew onboard the aircraft induce a number of known faults in various LRU's and other components. Resulting faults presented by such warning and caution systems are then logged in a flight work order (FWO), which can thereafter be analyzed by skilled personnel.

Whereas conventional techniques for monitoring and testing LRU's and other components of an aircraft are adequate, such conventional techniques have drawbacks. In this regard, many conventional techniques are limited in the number of LRU's and other components capable of being tested at any given instance. Also, whereas conventional techniques are capable of recording data output by the LRU's and other components, such techniques are incapable of identifying faults or other anomalies in such output data. In this regard, conventional techniques require the continuous recording of data output from the LRU's and other components without regard to whether such data indicates a fault or other anomaly. Such continuous recording of data, however, can require an undesirable amount of memory resources for such data, and require an undesirable amount of time to transfer to other computing systems to analyze such data.

SUMMARY OF THE INVENTION

In light of the foregoing background, embodiments of the present invention provide a system and method for recording events onboard a vehicle such as an aircraft. The system and method of embodiments of the present invention are capable of monitoring data output by modules of a vehicle during operation of the vehicle, such as LRU's of an aircraft during a pre-delivery test flight of the aircraft. More particularly, the system and method of embodiments of the present invention are capable of receiving data output onto one or more buses from one or more modules of the vehicle. The system and method of embodiments of the present invention can thereafter record and/or transmit at least a portion of the data for subsequent presentation, analysis or the like.

In contrast to conventional techniques for testing modules of a vehicle, the system and method of embodiments of the present invention are capable of monitoring the data output from all of the modules associated with a greater plurality of buses, such as all of the LRU's associated with the Mil-Std-1553 buses of an aircraft. Also in contrast to conventional techniques, if so desired, the system and method of embodiments of the present invention can be configured to identify events, such as faults, in the data output by the respective modules. By being capable of identifying the events, the system and method of embodiments of the present invention can selectively record and transmit data output from the modules, or filter out data output from the modules that does not indicate an event of one or more LRU's. As such, the system and method of embodiments of the present invention can monitor and record event data from modules of the vehicle without requiring an undesirable amount of memory resources, and as such, can transmit the recorded data without requiring an undesirable amount of time.

In accordance with one aspect of the present invention, a system is provided that comprises a vehicle (e.g., aircraft) including a plurality of modules (e.g., line-replaceable units—LRU's) capable of communicating over a plurality of buses (e.g., Mil-Std-1553 buses). The system also includes an advanced wireless open data controller (AWOC) capable of receiving data output onto the buses of the vehicle during operation of the vehicle, such as during flight of an aircraft. Then, if so desired, the AWOC can be capable of recording the output data. The AWOC is also capable of comparing the output data to a database of known events of the modules. Then, when the output data matches a known event for at least one module, the AWOC is capable of identifying an event. In various instances, the AWOC can be capable of identifying the event when the output data is further independent of an induced event.

After identifying the event, the AWOC can package event data including the identified event for the module(s). In addition, the AWOC can package event data further including data output by the respective module(s) for a given time period before and after the identified event. Irrespective of the contents of the event data, the AWOC can be capable of packaging the event data by compressing event data and/or removing one or more extraneous data fields of the event data based upon a format of the event data. A data unit, such as a satellite data unit also included within the system, is capable of transmitting the packaged event data external to the vehicle at least partially over a wireless communication link. The system can further include a user processor. In such instances, the user processor can be capable of receiving the packaged event data, unpackaging the packaged event data, and presenting the unpackaged event data. Advantageously, the user processor can be capable of receiving the packaged event data, unpackaging the packaged event data and presenting the unpackaged event data during operation of the vehicle.

The system can include a plurality of vehicles, such as a fleet of aircraft. In such instances, the system can also include a plurality of AWOC's, each associated with a vehicle and capable of receiving data output onto the buses of the associated vehicle. Also in such instances, the user processor can be capable of receiving the output data and/or the event data from each of the plurality of AWOC's. Also, the user processor can be capable of sending, to at least one AWOC, at least one of the output data and the event data from at least one other AWOC.

According to other aspects of the present invention, a method and advanced wireless open data controller (AWOC) are provided for recording events onboard a vehicle.

BRIEF DESCRIPTION OF THE DRAWINGS

Figure 1:
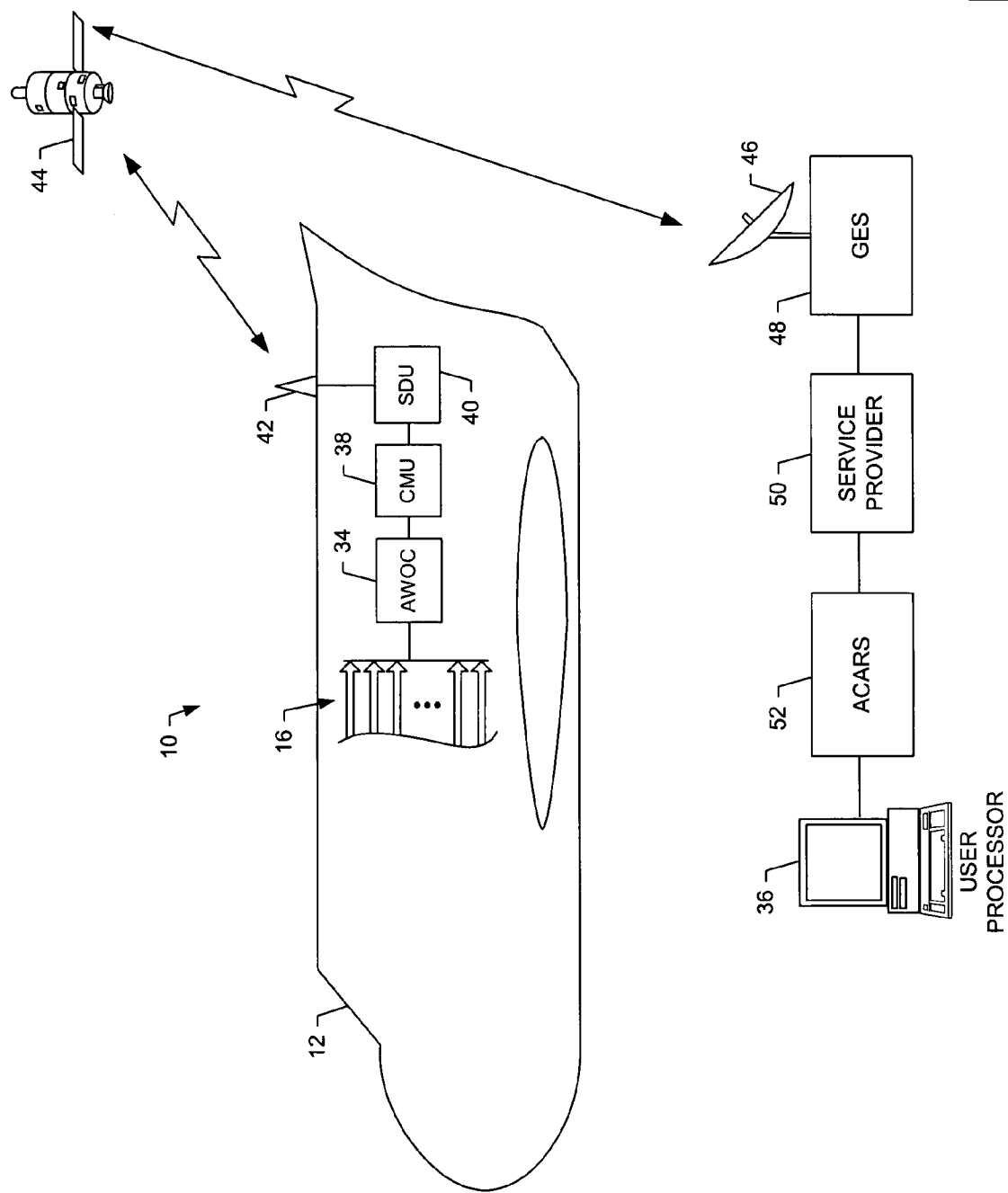
Figure 2:
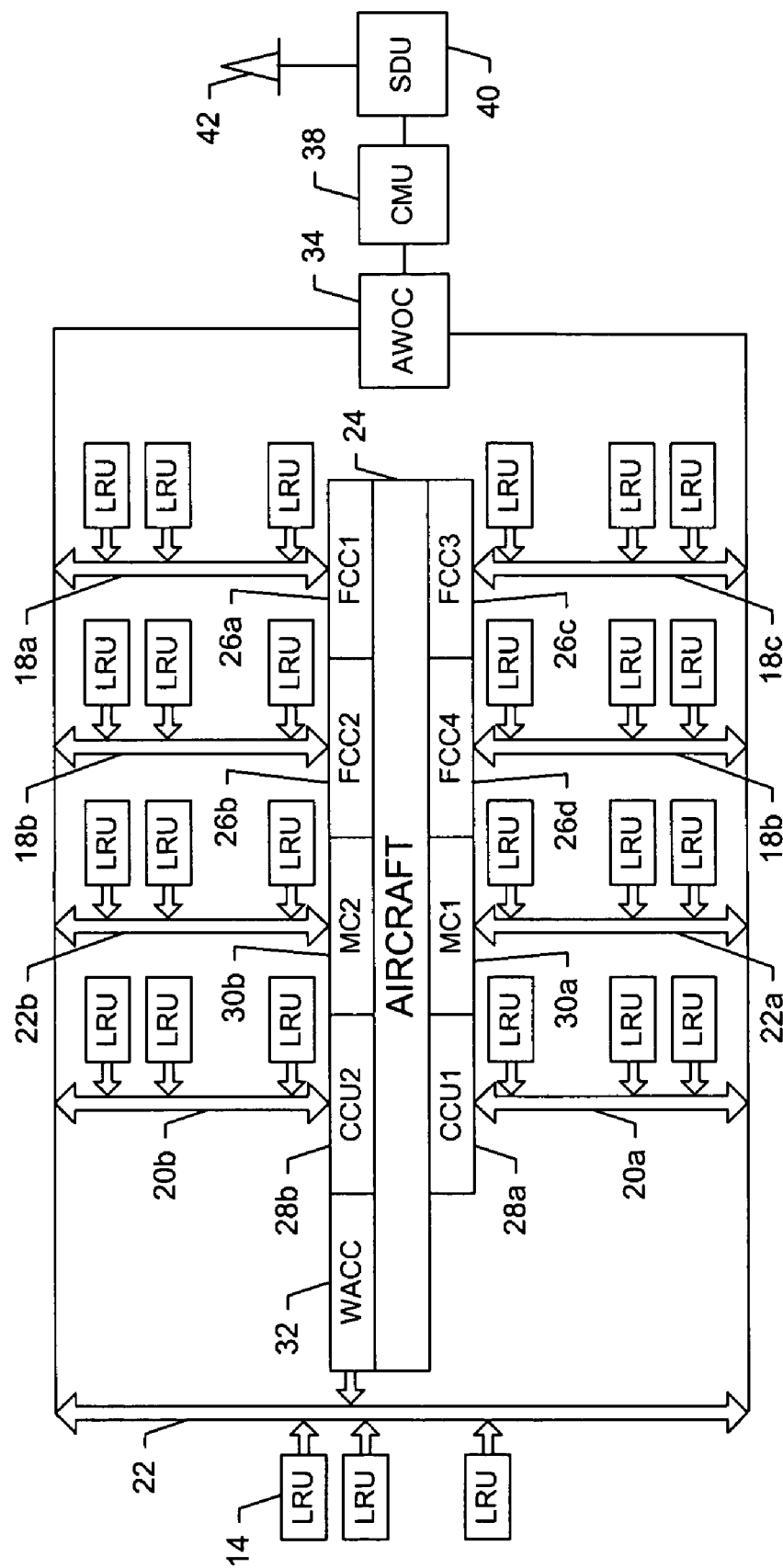
Figure 3:
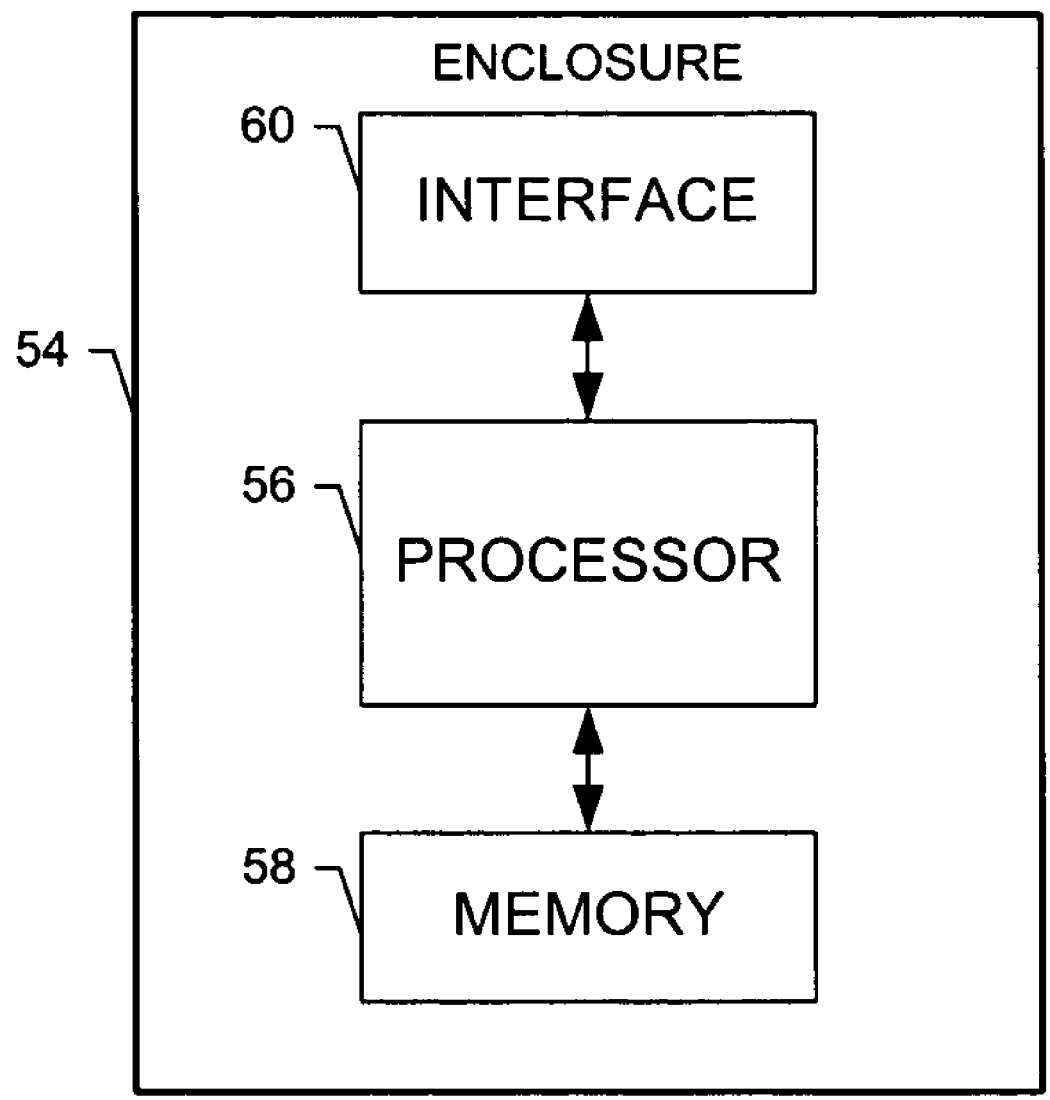
Figure 4:
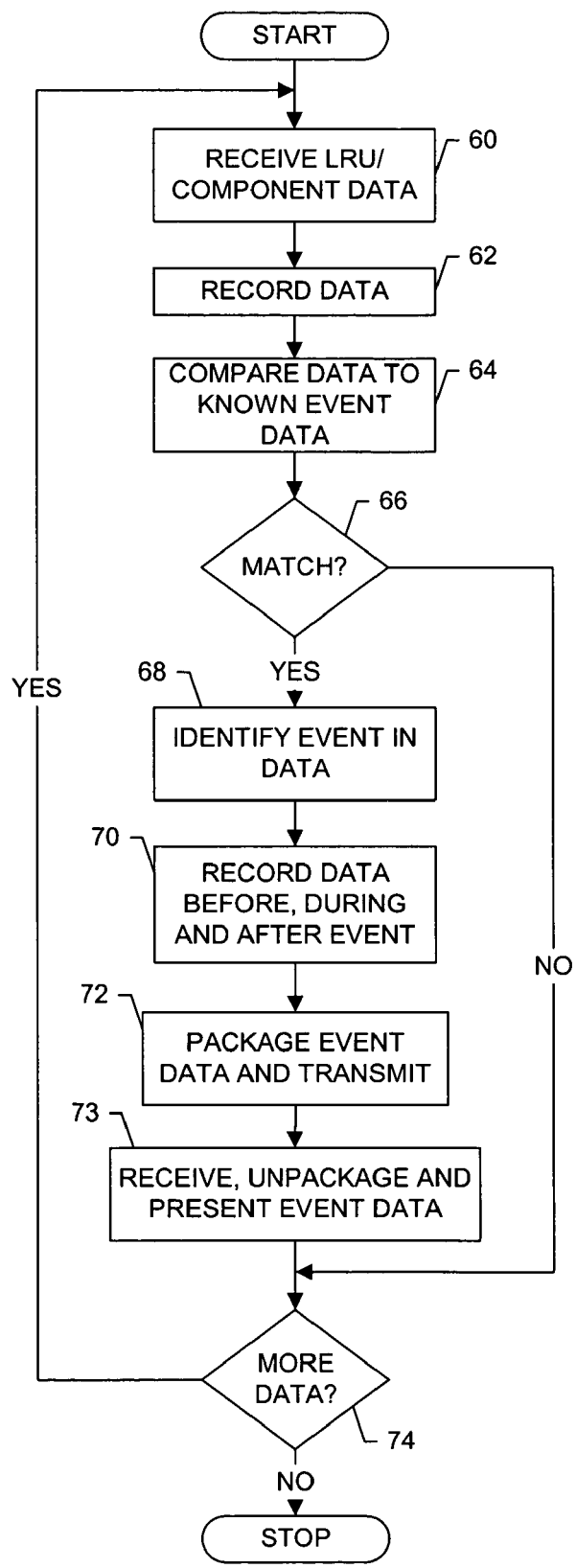
Figure 5:
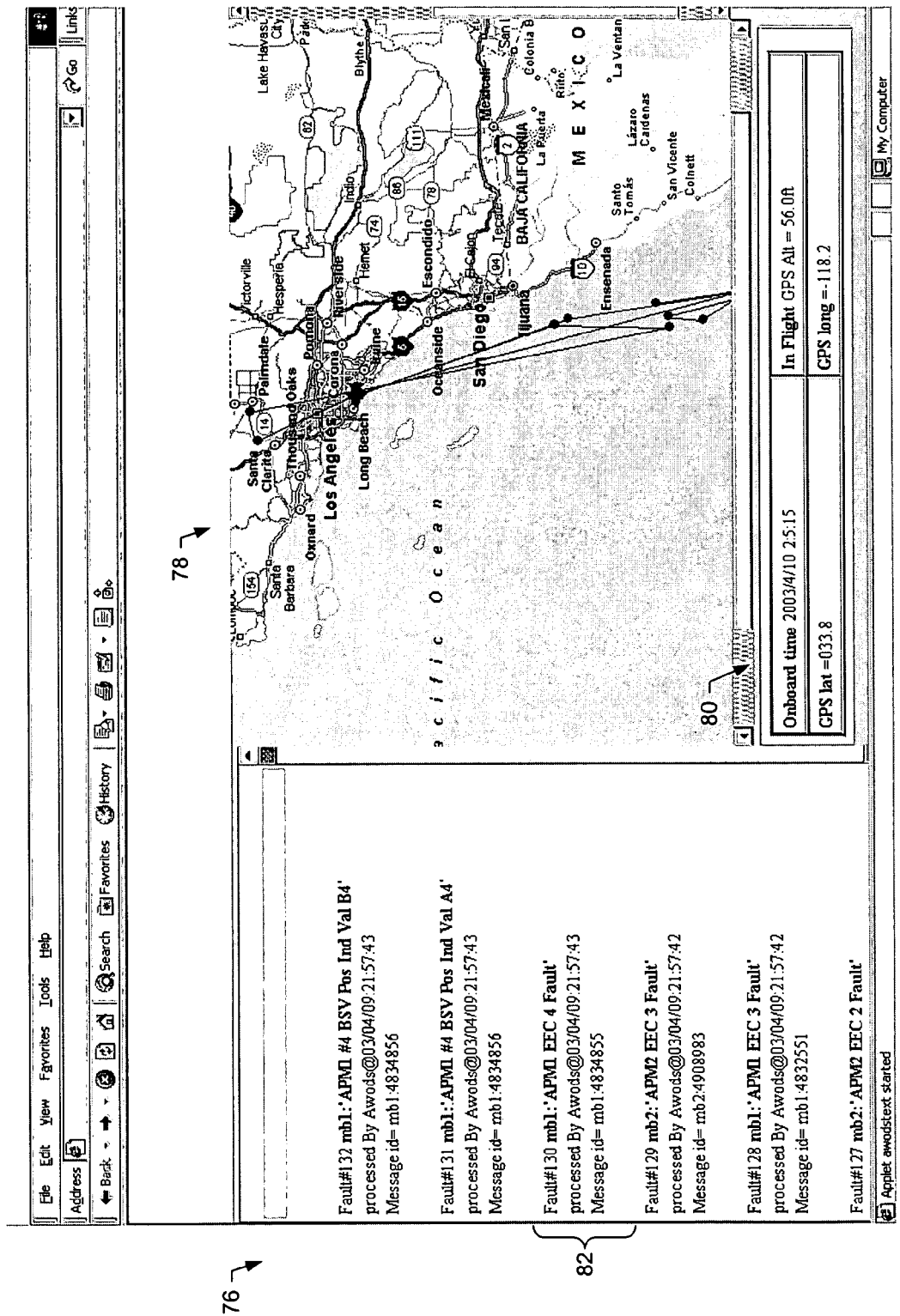
Figure 6:
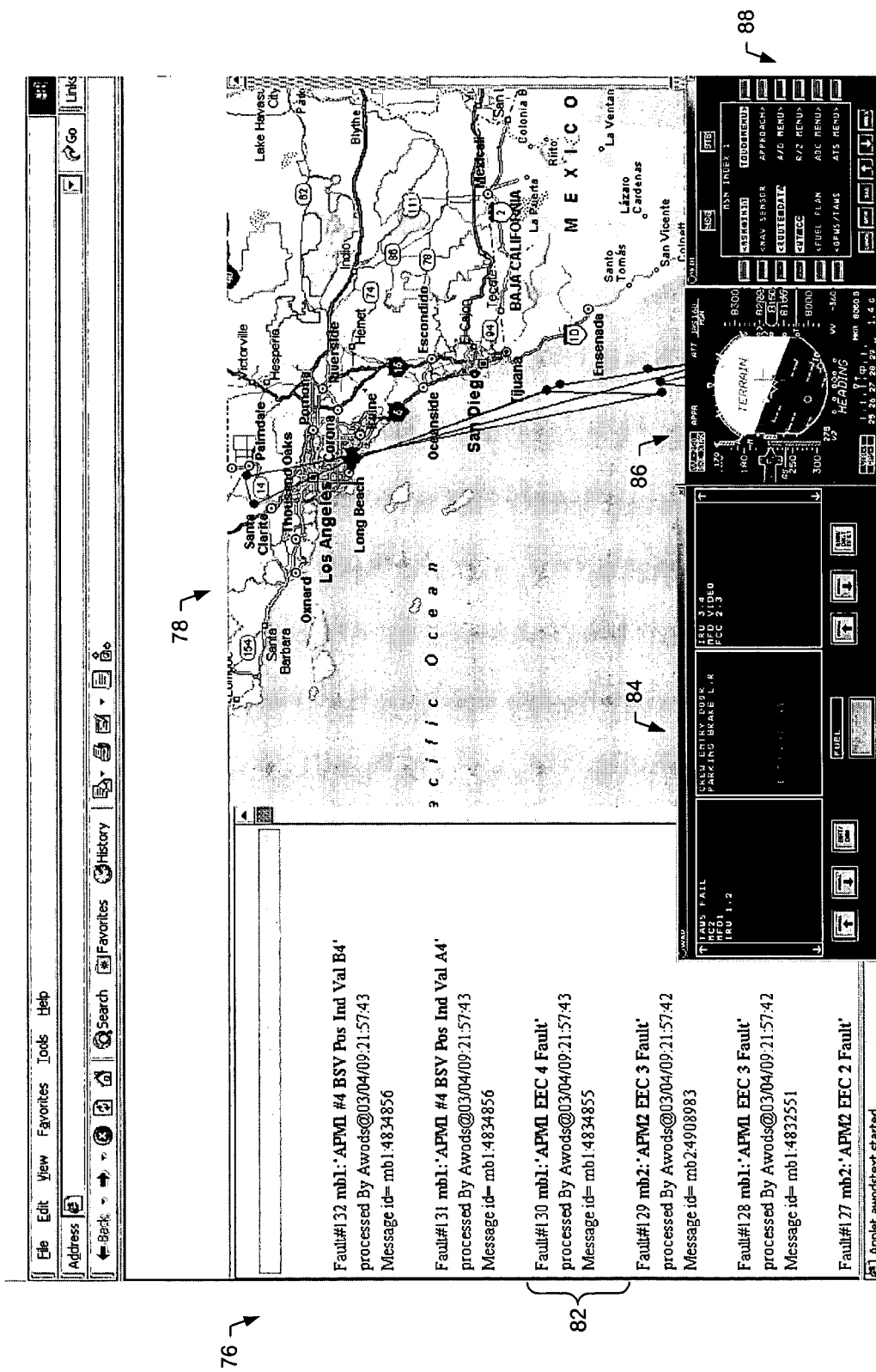

Having thus described the invention in general terms, reference will now be made to the accompanying drawings, which are not necessarily drawn to scale, and wherein:

FIG. 1 is a schematic block diagram of a system of recording events onboard a vehicle in accordance with one embodiment of the present invention;

FIG. 2 is a schematic block diagram more particularly illustrating the system of FIG. 1;

FIG. 3 is a schematic block diagram of an entity capable of operating as an advanced wireless open data controller (AWOC) in accordance with one embodiment of the present invention;

FIG. 4 is a flow chart of a method of recording events onboard a vehicle in accordance with one embodiment of the present invention;

FIG. 5 is an exemplar display of recorded event data presented in accordance with one embodiment of the present invention; and FIG. 6 is an exemplar display of recorded event data presented in accordance with another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system 10 for recording faults of a vehicle, such as an aircraft 12, is shown in accordance with embodiments of the present invention. The aircraft is described herein as comprising a C-17 military aircraft, although it will be appreciated immediately that the system and method of embodiments of the present invention are applicable to virtually any commercial or military aircraft, as well as other non-fixed wing aircraft. For example, the system and method of embodiments of the present invention are applicable to aircraft such as a Boeing 767T aircraft, Boeing MMA (multi-mission maritime aircraft) (B737) aircraft or the like. The method of the present invention can also easily be used with little or no modification to record events provided by various components or computers of other commercial and/or military vehicles including, but not limited to, tanks.

As will be appreciated, the aircraft 12 includes a number of line-replaceable-units (LRU's) 14 (see FIG. 2) passing data over a number of different avionics buses 16. As explained in the background section above, each LRU can comprise a highly complex module often incorporating several processors for controlling and/or monitoring one or more components or subassemblies of an aircraft. In this regard, each LRU of the aircraft can be provided to monitor and/or control one or more external devices such as an actuator, valve, motor, etc., associated with a particular component or assembly of the aircraft. In addition, as explained below, each LRU typically also generates output signals which can be monitored to determine if the LRU and/or the component with which it is associated is not properly operating.

The aircraft 12 can include any of a number of different LRU's 14, such as those identified above in the background section, capable of communicating across one or more avionics buses 16. Each avionics bus, and thus the respective LRU's, can be configured to communicate in accordance with any of a number of different standards or protocols. In one typical embodiment, for example, a plurality of avionics buses can be configured in accordance with Mil-Std-1553, entitled: *Military Standard Aircraft Internal Time Division Command/Response Multiplex Data Bus* (with which its revisions and updates is incorporated by reference herein for all purposes). In such instances, as shown more particularly in FIG. 2, aircraft such as the C-17 aircraft can include four flight control buses 18a-18d, two communication buses 20a, 20b, two mission buses 22a, 22b and a warning and caution system (WACS) bus 24.

Each Mil-Std-1553 bus 18a-18d, 20a, 20b, 22a, 22b, 24 of the aircraft 12, in turn, can include a primary and a secondary channel for transmitting signals between the various LRU's 14 and bus controller of the respective bus. In this regard, each of the LRU's associated with each Mil-Std-1553 bus is considered a bus controller or remote terminal and a single avionics bus configured in accordance with Mil-Std-1553 may support up to thirty-one separate remote terminals. For example, as shown in FIG. 2, each flight control bus 18a-18d can have an associated flight control computer (FCC) 26a-26d and a number of LRU's. Each FCC, then, can control the LRU's associated with a respective flight control bus to thereby control the primary and secondary flight surfaces of the aircraft.

Also, for example, each communication bus 20a, 20b can have an associated communication control unit (CCU) 28a, 28b and a number of LRU's. The CCU's can control the LRU's associated with the respective buses to control functions for the Integrated Radio Management System (IRMS), including radio, intercom and public address (PA) system control. Each mission bus 22a, 22b, for example, can have an associated mission computer (MC) 30a, 30b, often referred to as a core integrated processor (CIP). The MC's can control operation of a number of LRU's associated with the respective mission buses to provide control, display and data processing for navigation system modes and sensor management navigation capability. The MC's can also provide four-dimensional (4D) guidance of the aircraft, thrust management and data for aircraft takeoff, landing, missed approach and engine-out conditions. Further, for example, the WACS bus 24 can include a warning and caution computer WACC 32 controlling operation of a number of LRU's associated with the WACS bus. In addition, the WACC can convert aircraft status/failure signals for display on a warning annunciator panel (WAP).

As explained more fully below, to monitor the avionics buses 16 to test one or more of the LRU's 14 of the aircraft 12, such as during a pre-delivery test flight of the aircraft, the system of one embodiment of the present invention includes a monitoring controller 34, referred to herein as an advanced wireless open data controller (AWOC), coupled to one or more of the avionics buses 16. The AWOC is capable of receiving data output from one or more of the LRU's associated with one or more avionics buses, and thereafter recording and/or transmitting at least a portion of the data to a user processor 36 for subsequent presentation, analysis or the like. In contrast to conventional techniques for testing LRU's of an aircraft 12, the AWOC is capable of monitoring the data output from all of the LRU's associated with a greater plurality of avionics buses, such as all of the LRU's associated with the Mil-Std-1553 buses 18a-18d, 20a, 20b, 22a, 22b, 24. Also in contrast to conventional techniques, if so desired, the AWOC can be configured to identify events, such as faults, in the data output by the respective LRU's. By being capable of identifying the events, the AWOC can selectively record and transmit data output from the LRU's, or filter out data output from the LRU's that does not indicate an event of one or more LRU's. As such, the AWOC can monitor and record data from LRU's of the aircraft without requiring an undesirable amount of memory resources, and as such, can transmit the recorded data without requiring an undesirable amount of time.

The AWOC 34 can transmit the data to the user processor 36 in any of a number of different manners, but typically over a wireless communications link. In one typical embodiment, for example, the AWOC transmits the data to the user processor in accordance with a satellite communication technique. In this regard, the AWOC can communicate with a communications management unit (CMU) 38, also included within the aircraft 12. As will be appreciated by those skilled in the art, the CMU is capable of providing a communications link between the aircraft and external systems, while prioritizing such communications from different sources within the aircraft. In accordance with embodiments of the present invention, then, the CMU is also capable of receiving data from the AWOC. For example, the AWOC can communicate with the CMU over an ARINC 429 communications bus in accordance with the Williamsburg Bit Order Protocol (BOP). In turn, the CMU is capable of passing the data to a data unit, such as a satellite data unit (SDU) 40, which is coupled to an antenna 42, both of which are well known to those skilled in the art.

The SDU 30 can access an Aircraft Communication Addressing and Recording System (ACARS) system to facilitate transfer of the data to the user processor 36. As will be appreciated by those skilled in the art, ACARS is commonly used for two-way digital communications between an aircraft and a ground earth station (GES) via an ARINC communications network. More particularly, then, the SDU can transmit the data to a satellite 44 via the antenna 42. The satellite, in turn, passes the data to a satellite receiver 46 or dish coupled to a GES 48. From the GES, the data can pass through a service provider 50, such as an ARINC or Service Information and Technology Architecture (SITA) provider. For example, the data can pass through a network provided by, the mobile satellite communications network operator Inmarsat of London, England. Once the service provider receives the data, the service provider can forward the data to the user processor, such as via an ACARS server 52. Once the user processor receives the data, the user processor can utilize the data for a number of different purposes, such as for presentation, analysis or the like, as described below.

Referring now to FIG. 3, a block diagram of an entity capable of operating as an AWOC 34 is shown in accordance with one embodiment of the present invention. As shown, the AWOC can generally include a number of components housed within an enclosure 54 such as, for example, any of a number of enclosures manufactured by Miltron Systems Inc. of North Easton, Mass. The AWOC can include any of a number of different components, including one or more processors 56 connected to memory 58. The processor(s) can comprise any of a number of known processors such as, for example, model VMPC6D single board computer(s) (SBC) manufactured by Thales Computers of Raleigh, N.C. Likewise, the memory can comprise any of a number of known memories including, for example, a 6U model VME25 SCSI flash disk manufactured by Targa Systems Division, L-3 Communications of Canada Inc. of Ottawa, Ontario.

The memory 58 of the AWOC 34 can comprise volatile and/or non-volatile memory, and typically stores content, data or the like. For example, the memory typically stores software applications, instructions or the like for the processor(s) to perform steps associated with operation of the AWOC in accordance with embodiments of the present invention. For example, the memory can store an operating system, such as the VxWorks® operating system, distributed by Wind River of Alameda, Calif. As also described below, the memory typically stores at least a portion of data output by one or more of the LRU's as the AWOC monitors such LRU's. In addition, the memory can store a database of data representative of known events of one or more of the LRU's. For example, the memory can store a database of data representative of known faults or data representative of proper operation of one or more of the LRU's. As such, the AWOC can additionally or alternatively store, into the memory, select event data based upon whether the output data indicates an event in one or more LRU's of the aircraft 12.

In addition to the memory 58, the processor(s) 56 of the AWOC 24 can also be connected to at least one interface 60 or other means for transmitting and/or receiving data, content or the like between the AWOC and the avionics buses 16 of the aircraft 12. In one embodiment, for example, the processor(s) is connected to one or more Mil-Std-1553 bus interfaces, one or more of which can comprise a model QPMC-1553 Mil-Std-1553 PMC (PCI Mezzanine Card) interface manufactured by Condor Engineering of Santa Barbara, Calif. The processor(s) can additionally, or alternatively, be connected to one or more ARINC 429 bus interfaces, one or more of which can comprise a model CEI-820 PMC interface manufactured by Condor Engineering. The interface(s) can be directly connected to the processor(s). As will be appreciated, however, the one or more of the interface(s) can alternatively be indirectly connected to the processor(s), such as via one or more Versa Module Europa (VME) PMC carriers, which can comprise VME PMC carrier's manufactured by Thales Computers.

Reference is now made to FIG. 4, which illustrates a method of recording events onboard an aircraft 12 in accordance with one embodiment with the present invention. Generally, as shown in block 60, the method includes the AWOC 34 receiving data output by the LRU's 14 of the aircraft over the avionics buses 16. In one typical embodiment, for example, the AWOC can receive data output by the LRU's associated with both channels of all nine Mil-Std-1553 buses (i.e., flight control buses 18a-18d, communication buses 20a, 20b, mission buses 22a, 22b and WACS bus 24) of a C-17 aircraft. The data can include any of a number of different pieces of data output by the respective LRU's, but in one typical embodiment, the data comprises data output by the respective LRU's during a pre-delivery test flight of the aircraft. As will be appreciated, then, the data of this typical embodiment is intended to comprise the same data as the respective LRU's output during any of a number of different typical flights of the aircraft.

As the AWOC 34 receives the data output by the LRU's 14 onto the avionics buses 16, the AWOC can record the data into memory 58, as shown in block 62. The AWOC can record the data as the AWOC receives the data from the respective buses. In one typical embodiment, however, the AWOC performs a lossless compression technique before recording such data. In such instances, for example, the AWOC can record only changes in data output by respective LRU's, recording only data header information for the same data output by respective LRU's from one instant to the next instant.

Also as the AWOC 34 receives the data, the AWOC can retrieve, from a database in the memory 58, data representative of known events of one or more of the LRU's 14. The AWOC can then compare the data output by the LRU's to the data representative of events of the LRU's, as shown in block 64. If the AWOC does not detect a match between the data output by any LRU and one or more pieces of data representative of an event of the LRU's, the AWOC can continue to receive, record and compare data output by the LRU's, as illustrated in blocks 66 and 74. If the AWOC detects a match, however, the AWOC can identify an event of the respective LRU's, as shown in block 68. In such instances, the AWOC can separately record data for the respective event(s) by recording data output by the respective LRU's during the event. Additionally, in one typical embodiment, the AWOC records data output by the respective LRU's for a given time period (e.g., one second) before and after the event.

In various instances, the system and method of embodiments of the present invention can operate in parallel with aircrew onboard the aircraft monitoring and testing the LRU's 14 by inducing a number of known faults in various LRU's and other components for subsequent logging in a flight work order (FWO). In such instances, the AWOC 34 can be further configured such that, even if the AWOC detects a match between the data output by any LRU and one or more pieces of data representative of an event of the LRU's, the AWOC can operate as though the AWOC did not detect a match when the event comprises an induced fault. In this regard, the AWOC can identify induced faults in any of a number of different manners, such as by pre-programming the AWOC with a flight plain including a number of scripted faults.

After recording the event data, the AWOC 34 can package the event data, such as to reduce the size of the event data, as shown in block 72. In addition, the AWOC can package one or more additional pieces of data with the event data, if so desired. For example, the AWOC can package an identifier (e.g., tail number) and/or location (e.g., latitude, longitude, altitude, etc.) of the aircraft, and/or date and/or time information, along with the event data. The AWOC can package the event data and any other data in accordance with any of a number of known techniques. In one typical embodiment, for example, the AWOC packages the event data by compressing the event data in accordance with the GZIP compression technique, as such is well known to those skilled in the art. In addition, before compressing the data, the AWOC can further package the data by removing any extraneous data fields from the data structure of the event data. For example, the AWOC can remove data fields such as unused data words and additional message identifiers.

After packaging the event data, the AWOC 34 can transmit the data to a user processor 36, as shown in FIG. 1 and block 72 of FIG. 4. The AWOC can transmit the data in any of a number of different manners. In one typical embodiment, as explained above, the AWOC transmits the data in accordance with a satellite communication technique via the CMU 38, SDU 40 and antenna 42 of the aircraft 12. Although not shown, upon receipt of the data at the user processor, the packaged event data can be unpackaged, such as by reinserting the extraneous data fields from the data structure of the event data and uncompressing the event data. Thereafter, the event data can be presented to skilled personnel, such as for analysis, as shown in block 73. In one typical embodiment, the event data is advantageously capable of being received and/or presented by the user processor during the flight of the aircraft during which the AWOC identified the respective event. As such, event(s) of the LRU's 14 of the aircraft are capable of being received and/or presented in at least a partial real-time manner by the user processor.

As an example of a typical scenario that would benefit from the system and method of embodiments of the present invention, consider that during a pre-delivery test flight of the aircraft 12, a first radar altimeter (RAD) associated with the first mission bus 22a experiences a fault. During normal operation, as will be appreciated, the RAD communicates with the first MC 30a over the first mission bus to provide altitude information regarding the aircraft. Thus, in instances in which the RAD experiences a fault, data output by the RAD to the MC can indicate such a fault. After the RAD outputs data onto the first mission bus for the first MC, the AWOC 34 can receive the data from the mission bus and record the data, along with the data output from the other LRU's 14 of the aircraft (see block 62 of FIG. 4). In addition, the AWOC can compare the data to the database stored in memory 58 to identify the fault in the RAD, and thereafter package the event data and transmit the packaged event data to the user processor 36.

As indicated above, the event data can be presented by the user processor in any of a number of different manners. In the exemplar display of FIG. 5, for example, the event data 76 can be presented on a display of the user processor 36 alongside a graphical representation 78 of the flight path of the aircraft 12 and a current time and position 80 of the aircraft 12. As shown, for example, a fault #130 82 is shown as "mb1: APM1EEC 4 Fault," and indicates the date and time of the fault (i.e., "03/04/09:21:57:43"), as well as a unique identifier of the fault message (i.e., "Message id=mb1:4834855"). In the above example, "mb1" indicates a fault identified on the first mission bus 22a. Also, "APM1" and "EEC 4" indicate that the fault occurred at the fourth electronic engine control (EEC) LRU and was detected at the first aircraft propulsion data management computer (APM), which is associated with the first mission bus and is coupled to the fourth EEC via an ARINC 429 bus.

As will be appreciated, in addition to a graphical representation of the flight path of the aircraft, the event data can additionally or alternatively be presented along with graphical representations of one or more cockpit displays of the aircraft. As shown in FIG. 6, for example, the event data can be presented along with overlaid graphical representations of the WAP 84, primary flight display 86 and mission computer communication display 88. Thus, as shown and described herein, the event data can be presented along with a number of different pieces of information (e.g., graphical representation of the aircraft flight path 78, time/position information 80, graphical representations of the WAP 84, primary flight display 86 and mission computer communication display 88) for analysis. It should be noted that in various instances data output from the LRU's 14 of the aircraft other than the event data may be desired for presentation and/or analysis. In such instances, one or more pieces of the data recorded by the AWOC 34 (see block 62 of FIG. 4) can be received by the user processor 36 in addition to the event data for presentation and/or analysis. For example, during a test flight of the aircraft 12, one or more pieces of the data output by the LRU's can be continuously transmitted to the user processor, such as in the same manner as the event data. Additionally or alternatively, for example, following a test flight of the aircraft, piece(s) of the data output by the LRU's can be transferred (e.g., downloaded) from the memory 58 of the AWOC to the user processor, such as in accordance with any of a number of different data transfer techniques. Thus, by receiving piece(s) of data output by the LRU's other than the event data, the user processor can, if so desired, replay at least a portion of a flight of the aircraft, including the state of the respective LRU's during the flight.

As will also be appreciated, the event data can be analyzed in any of a number of different manners. In one embodiment, in addition to presenting the event data for display by the user processor 36, the user processor can also include a ground-based reasoner, such as a software, hardware or firmware ground-based reasoner. The ground-based reasoner can comprise a knowledge-based system that reads data (LRU data and/or event data) recorded by the AWOC 34. In turn, the ground-based reasoner can isolate faults in one or more of the LRU's 14 by data mining the data output by the LRU's and recorded by the AWOC into memory 58. For example, upon recognition of a disagree fault in a slat sensor of the aircraft 12, the ground-based reasoner can check the data output from all of the aircraft slat sensors at the time the AWOC identified a fault in a slat sensor to determine the specific slat sensor that caused the fault.

It should further be appreciated that the system of embodiments of the present invention can be employed in a plurality of vehicles, such as a fleet of aircraft 12. In such instances, the AWOC's 34 of the aircraft can form a network with a centralized user processor 36 such that the AWOC's can operate or otherwise function in a network-centric manner. The user processor, then, can receive data output by the LRU's 14 of the fleet of aircraft and/or event data for the respective LRU's of the fleet. By receiving the data output by, and/or the event data of, the LRU's of each aircraft of a fleet of aircraft, the user processor can individually monitor the LRU's of the respective aircraft, and/or collectively monitor one or more of the LRU's of the fleet. Further, the user processor can communicate with the AWOC's of each of the aircraft of the fleet, such as across the same channel as the AWOC's communicate with the user processor, to send data to the aircraft. More particularly, for example, the user processor can communicate the data output by, and/or the event data of, the LRU's of one or more of the aircraft to the AWOC's of one or more other aircraft. Thus, for example, the user processor can facilitate aircraft coordinating operation with each other based upon the data output by, and/or the event data of, the LRU's of the respective aircraft.

Although the aircraft 12 is shown and described herein as including a number of Mil-Std-1553 buses, the aircraft can, and typically does, include one or more avionics buses configured to communicate in accordance with other protocols or standards. For example, the aircraft can include one or more avionics buses 16, and thus LRU's 14, configured to communicate in accordance with ARINC 429, 629 or the like. Thus, as described herein, the system and method of embodiments of the present invention are capable of recording events from data output on one or more of the Mil-Std-1553 buses. It should be understood, however, that the system and method of embodiments of the present invention can be equally applicable to any of a number of other buses or communication links between components of an aircraft.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
a vehicle including a plurality of modules configured to communicate over a plurality of buses; and
an advanced wireless open data controller (AWOC) configured to receive and record data output by the modules onto the buses of the vehicle during operation of the vehicle, wherein the AWOC is also configured to compare the output data to a database of known events of the modules, and when at least a portion of the output data matches a known event for at least one module, identify an event, and package event data including the identified event, the respective portion of the output data for the identified event and at least a portion of the output data for a given time period before and after the identified event, the AWOC being configured to separately record the data output by the modules and package event data for the identified event, and wherein the vehicle includes a module comprising a data unit configured to transmit the packaged event data to a destination external to the vehicle at least partially over a wireless communication link.

2. A system according to claim 1, wherein the vehicle comprises an aircraft including a plurality of line-replaceable units (LRU's) configured to communicate over a plurality of Mil-Std-1553 buses, and wherein the AWOC is configure to receive data output onto the buses of the aircraft during a flight of the aircraft.

3. A system according to claim 1, wherein the AWOC is configured to package event data including being configured to at least one of compress event data or remove at least one extraneous data field of the event data based upon a format of the event data.

4. A system according to claim 1, wherein the AWOC is further configured to record the output data after receiving the output data.

5. A system according to claim 1, wherein the AWOC is configured to identify an event when the output data matches a known event for at least one module, and the output data is independent of an induced event.

6. A system according to claim 1 further comprising a user processor configured to receive the packaged event data, unpackage the packaged event data, and present the unpackaged event data, wherein the user processor is configured to receive the packaged event data, unpackage the packaged event data and present the unpackaged event data during operation of the vehicle.

7. A system comprising:
a plurality of vehicles each including a plurality of modules configured to communicate over a plurality of buses;
a plurality of advanced wireless open data controllers (AWOC's), wherein each AWOC is associated with a vehicle and is configured to receive and record data output onto the buses of the associated vehicle, wherein each AWOC is also configured to compare the respective output data to a database of known events of the modules of the respective vehicle, and when at least a portion of the output data matches a known event for at least one respective module, identify an event, and package event data including the identified event, the respective portion of the output data for the identified event and at least a portion of the output data for a given time period before and after the identified event, the AWOC being configured to separately record the data output by the modules and package event data for the identified event,
wherein each vehicle includes a module comprising a data unit configured to transmit the packaged event data at least partially over a wireless communication link; and
a user processor located external to the vehicles, wherein the user processor is configured to receive at least one of the output data or the event data from each of the AWOC's.

8. A system according to claim 7, wherein the user processor is also configured to send, to at least one AWOC, at least one of the output data or the event data from at least one other AWOC.

9. A method of recording events onboard a vehicle comprising:
receiving and recording data output from a plurality of modules of the vehicle, the data being output onto a plurality of buses during operation of the vehicle;

comparing the output data to a database of known events of the modules; and when at least a portion of the output data matches a known event for at least one module, identifying an event;

packaging event data including the identified event, the respective portion of the output data for the identified event and at least a portion of the output data for a given time period before and after the identified event, the event data being packaged separate from recording the output data; and transmitting the packaged event data to a destination external to the vehicle at least partially over a wireless communication link.

10. A method according to claim 9, wherein receiving data comprises receiving data output onto a plurality of Mil-Std-1553 buses from a plurality of line-replaceable units (LRU's) of an aircraft during a flight of the aircraft.

11. A method according to claim 9, wherein packaging event data comprises at least one of compressing event data or removing at least one extraneous data field of the event data based upon a format of the event data.

12. A method according to claim 9 further comprising recording the output data after receiving the output data.

13. A method according to claim 9, wherein identifying an event comprises identifying an event when the output data matches a known event for at least one module, and the output data is independent of an induced event.

14. A method according to claim 9 further comprising:
receiving the packaged event data;
unpackaging the packaged event data; and
presenting the unpackaged event data,
wherein receiving the packaged event data, unpackaging the packaged event data and presenting the unpackaged event data occur during operation of the vehicle.

15. A method according to claim 9, wherein packaging event data comprises packaging event data further including data output by the respective at least one module for a given time period before and after the identified event.

16. A method of recording events onboard a plurality of vehicles, the method comprising:
transmitting packaged event data from the vehicles, wherein transmitting packaged event data from each vehicle comprises:
receiving and recording data output from a plurality of modules of the vehicle, the data being output onto a plurality of buses during operation of the vehicle;
comparing the output data to a database of known events of the modules; and when at least a portion of the output data matches a known event for at least one module,
identifying an event;
packaging event data including the identified event, the respective portion of the output data for the identified event and at least a portion of the output data for a given time period before and after the identified event, the event data being packaged separate from recording the output data; and
transmitting the packaged event data to a destination external to the vehicle at least partially over a wireless communication link; and
receiving at least one of the output data recorded or the event data packaged for each of the plurality of vehicles.

17. A method according to claim 16 further comprising sending to at least one vehicle at least one of the output data recorded or the event data packaged for at least one other vehicle.

18. An advanced wireless open data controller (AWOC) for recording events onboard a vehicle comprising:
a memory configured to store a database of known events of a plurality of modules of the vehicle; and
a processor configured to receive and record data output onto a plurality of buses from the modules of the vehicle during operation of the vehicle, wherein the processor is also configured to compare the output data to the database of known events of the modules, and when at least a portion of the output data matches a known event for at least one module, identify an event, and package event data including the identified event, the respective portion of the output data for the identified event and at least a portion of the output data for a given time period before and after the identified event, the processor being configured to separately record the data output by the modules and package event data for the identified event, and the processor being configured to package the event for transmission data to a destination external to the vehicle at least partially over a wireless communication link.

19. An AWOC according to claim 18, wherein the memory is configured to store a database of known events of a plurality of line-replaceable units (LRU's) of an aircraft, and wherein the processor is configured to receive data output onto a plurality of Mil-Std-1 553 buses from the LRU's during a flight of the aircraft.

20. An AWOC according to claim 18, wherein the processor is configured to package event data including being configured to at least one of compress event data or remove at least one extraneous data field of the event data based upon a format of the event data.

21. An AWOC according to claim 18, wherein the processor is further configured to record, and the memory configured to store, the output data after the processor receives the output data.

22. An AWOC according to claim 18, wherein the processor is configured to identify an event when the output data matches a known event for at least one module, and the output data is independent of an induced event.

23. An AWOC according to claim 18, wherein the processor is configured to package event data such that the event data can be further received, unpackaged and presented during operation of the vehicle.

* * * * *